(12) United States Patent
de Ruijter et al.

(10) Patent No.: US 10,305,676 B2
(45) Date of Patent: May 28, 2019

(54) APPARATUS FOR RECEIVER WITH DIGITAL SIGNAL ARRIVAL DETECTOR AND ASSOCIATED METHODS

(71) Applicant: Silicon Laboratories Inc., Austin, TX (US)

(72) Inventors: Hendricus de Ruijter, Sunnyvale, CA (US); Ping Xiong, Sunnyvale, CA (US); Wentao Li, Mountain House, CA (US); Yan Zhou, Spicewood, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/168,080

(22) Filed: May 29, 2016

(65) Prior Publication Data

US 2016/0277177 A1    Sep. 22, 2016

Related U.S. Application Data

(63) Continuation-in-part of application No. 14/080,405, filed on Nov. 14, 2013, and a continuation-in-part of application No. 13/949,837, filed on Jul. 24, 2013, now Pat. No. 9,720,875, and a continuation-in-part of application No. 15/164,363, filed on May 25, 2016.

(51) Int. Cl.
| | |
|---|---|
| *H04B 1/16* | (2006.01) |
| *H04J 3/16* | (2006.01) |
| *H04L 7/04* | (2006.01) |
| *G06F 13/42* | (2006.01) |
| *H04L 27/14* | (2006.01) |
| *H04W 56/00* | (2009.01) |
| *H04B 17/318* | (2015.01) |

(52) U.S. Cl.
CPC .......... *H04L 7/042* (2013.01); *G06F 13/4295* (2013.01); *H04B 1/16* (2013.01); *H04B 17/318* (2015.01); *H04L 27/14* (2013.01); *H04W 56/00* (2013.01); *H04J 3/1605* (2013.01)

(58) Field of Classification Search
CPC combination set(s) only.
See application file for complete search history.

(56) References Cited

U.S. PATENT DOCUMENTS

| | | | |
|---|---|---|---|
| 3,787,863 | A | 1/1974 | Watanabe |
| 4,020,461 | A | 4/1977 | Adams |
| | | (Continued) | |

OTHER PUBLICATIONS

U.S. Appl. No. 14/080,405, de Ruitjer et al., filed Nov. 2013.
(Continued)

*Primary Examiner* — Wednel Cadeau
(74) *Attorney, Agent, or Firm* — Law Offices of Maximilian R. Peterson

(57) ABSTRACT

An apparatus includes a radio frequency (RF) receiver, which includes a digital signal arrival (DSA) detector to detect arrival of a transmitted signal. The DSA detector includes a signal correlator and at least one of (a) an absolute received signal strength indication (RSSI) detector; (b) a relative RSSI detector; and (c) a frequency offset detector). The RF receiver further includes a demodulator coupled to the DSA detector to demodulate a received signal and to provide a demodulated signal, and a synchronization word detector (SWD) coupled to the demodulator to receive the demodulated signal.

20 Claims, 10 Drawing Sheets

(56) References Cited

U.S. PATENT DOCUMENTS

| | | | |
|---|---|---|---|
| 4,219,778 A * | 8/1980 | Ishii | H03J 3/12 455/182.2 |
| 4,458,206 A | 7/1984 | Dellande | |
| 5,335,348 A * | 8/1994 | Kono | H03J 1/0008 455/192.2 |
| 5,384,564 A | 1/1995 | Wycoff | |
| 5,450,477 A | 9/1995 | Dutta | |
| 5,946,292 A * | 8/1999 | Tsujishita | H04L 27/2657 370/204 |
| 6,389,270 B1 | 5/2002 | Nohrden | |
| 6,438,183 B1 | 8/2002 | Taura | |
| 6,516,028 B1 | 2/2003 | Kobayashi | |
| 7,212,798 B1 * | 5/2007 | Adams | H03G 3/3068 330/278 |
| 7,636,404 B2 | 12/2009 | Guo | |
| 8,295,404 B1 | 10/2012 | Husted | |
| 8,711,718 B2 | 4/2014 | Su | |
| 2002/0145971 A1 | 10/2002 | Cho | |
| 2005/0100105 A1 | 5/2005 | Jensen | |
| 2005/0249307 A1 | 11/2005 | Yu | |
| 2006/0270355 A1 | 11/2006 | Mak | |
| 2009/0046764 A1 | 2/2009 | Manzi | |
| 2009/0060104 A1 * | 3/2009 | Sher | H04B 1/0014 375/345 |
| 2009/0180524 A1 | 7/2009 | Wang | |
| 2010/0128817 A1 | 5/2010 | Philips | |
| 2010/0184384 A1 * | 7/2010 | Jones | H04B 17/318 455/67.11 |
| 2012/0146834 A1 | 6/2012 | Karr | |
| 2012/0288040 A1 | 11/2012 | Yi | |
| 2013/0022148 A1 | 1/2013 | Sagi | |
| 2013/0278914 A1 | 10/2013 | Demarest | |
| 2015/0030061 A1 | 1/2015 | de Ruijter | |
| 2016/0353398 A1 | 12/2016 | de Ruijter | |

OTHER PUBLICATIONS

U.S. Appl. No. 13/949,837, de Ruijter et al., filed Jul. 2013.
U.S. Appl. No. 15/164,363, de Ruijter et al., May 2016.
U.S. Appl. No. 15/370,674, Xiong et al., Dec. 2016.
Iwanami et al., *Sequence Estimation Scheme Using Viterbi Algorithm for Improving Bit Error Rate of Binary Continuous Phase FSK with Limiter Discriminator and Integrate & Dump Filter Detection*, ICCS/ISITA 2002, 5 pgs.
Office communication in U.S. Appl. No. 15/164,363, filed Oct. 19, 2018, 7 pgs.
U.S. Appl. No. 15/370,693, de Ruijter, filed Dec. 2016.
U.S. Appl. No. 15/472,609, Zhou, Mar. 2017.
Aulin et al., *Continuous Phase Modulation-Part II: Partial Response Signaling*, IEEE Transactions on Communications, vol. COM:29, No. 3, Mar. 1981, 16 pgs.
Proakis, Digital Communications, Fourth Edition, 289-295 (2001), 8 pgs.
Zhang et al., *Low-Effort High-Performance Viterbi-based Receiver for Bluetooth LE Applications*, 4 pgs.
Office communication in U.S. Appl. No. 15/370,674, filed Jul. 28, 2017, 13 pgs.
Office communication in U.S. Appl. No. 15/164,363, filed Nov. 9, 2017, 10 pgs.
Office communication in U.S. Appl. No. 15/164,363, filed May 10, 2018, 13 pgs.
Office communication in U.S. Appl. No. 15/370,674, filed Feb. 22, 2017, 17 pgs.
Office communication in U.S. Appl. No. 15/370,674, filed Jun. 1, 2018, 14 pgs.
Office communication in U.S. Appl. No. 15/370,693, filed Jul. 28, 2017, 14 pgs.
Office communication in U.S. Appl. No. 15/370,693, filed Feb. 14, 2018, 17 pgs.
Office communication in U.S. Appl. No. 15/370,693, filed Jun. 1, 2018, 16 pgs.
Freescale Semiconductor, Inc., *ISDN Universal Digital Loop Transceivers II*, 1995 (16 pgs.), available at https://www.nxp.com/docs/en/data-sheet/MC145421.pdf.
Office communication in U.S. Appl. No. 15/472,609, filed Aug. 31, 2018, 16 pgs.
Office communication in U.S. Appl. No. 15/164,363, filed Sep. 18, 2018, 8 pgs.
Office communication in U.S. Appl. No. 15/370,674, filed Sep. 20, 2018, 13 pgs.
Office communication in U.S. Appl. No. 15/370,693, Sep. 20, 2018, 14 pgs.

* cited by examiner

APPARATUS FOR RECEIVER WITH DIGITAL SIGNAL ARRIVAL DETECTOR AND ASSOCIATED METHODS

CROSS-REFERENCE TO RELATED APPLICATIONS

The instant application is a continuation-in part of U.S. patent application Ser. No. 14/080,405, filed on Nov. 14, 2013, titled "Receiver with Signal Arrival Detection Capability." The instant application is also a continuation-in part of U.S. patent application Ser. No. 13/949,837, filed on Jul. 24, 2013, titled "Receiver with Signal Arrival Detection Capability." The instant application is also a continuation in part of U.S. patent application Ser. No. 15/164,363, filed on May 25, 2016, titled "Apparatus for Receiver With Multi-Bit Observation Interval and Associated Methods." The foregoing applications are incorporated by references in their entireties for all purposes.

TECHNICAL FIELD

The disclosure relates generally to communication apparatus and associated methods. More particularly, the disclosure relates to apparatus for receivers with digital signal arrival (DSA) circuits, and associated methods.

BACKGROUND

With the increasing proliferation of wireless technology, such as Wi-Fi, Bluetooth, and mobile or wireless Internet of things (IoT) devices, more devices or systems incorporate radio frequency (RF) circuitry, such as receivers and/or transmitters. To reduce the cost, size, and bill of materials, and to increase the reliability of such devices or systems, various circuits or functions have been integrated into integrated circuits (ICs). For example, ICs typically include receiver and/or transmitter circuitry. A variety of types and circuitry for transmitters and receivers are used. Transmitters send or transmit information via a medium, such as air, using RF signals. Receivers at another point or location receive the RF signals from the medium, and retrieve the information. Typically, transmitters transmit coded data via RF signals. Receivers receive, decode, demodulate, etc. the RF signals to retrieve the data.

Some wireless communication standards define a preamble for a wireless packet, which is a predefined data pattern that a receiver can use to detect and settle its control loops. The control loops may include the Automatic Gain Control (AGC), Automatic Frequency Compensation (AFC), and Bit Clock Recovery (BCR). After the receiver detects the end of the preamble, the receiver is prepared to receive a full packet including payload data. Some receivers use a preamble detector to detect the arrival of a frame. In response to the preamble detector signaling the detection of the preamble, the receiver begins looking for the next portion of the frame. In the M-bus frame protocol, this next portion is a synchronization (SYNC) word. Under certain circumstances, the preamble detector can occasionally provide a false trigger, such as when a co-channel continuous wave (CW) tone is received at around sensitivity of the preamble detector, or when certain noise patterns are received.

The description in this section and any corresponding figure(s) are included as background information materials. The materials in this section should not be considered as an admission that such materials constitute prior art to the present patent application.

SUMMARY

A variety of communication apparatus and associated methods are contemplated. According to one exemplary embodiment, an apparatus includes an RF receiver, which includes a digital signal arrival (DSA) detector to detect arrival of a transmitted signal. The DSA detector includes a signal correlator and at least one of (a) an absolute received signal strength indication (RSSI) detector; (b) a relative RSSI detector; and (c) a frequency offset detector). The RF receiver further includes a demodulator coupled to the DSA detector to demodulate a received signal and to provide a demodulated signal, and a synchronization word detector (SWD) coupled to the demodulator to receive the demodulated signal.

According to another exemplary embodiment, an IC includes an RF receiver, which includes a controller and a signal correlator. The signal correlator is coupled to the controller, and detects arrival of a signal, and provides a detect signal to the controller. The RF receiver further includes an RSSI detector coupled to controller to provide at least one detect signal to the controller. The RF receiver further includes a frequency offset detector coupled to controller to provide a frequency error signal to the controller.

According to another exemplary embodiment, a method of receiving RF signals. The method includes detecting, by using a digital signal arrival detector, arrival of a transmitted signal, by using a signal correlator, and (a) an absolute received signal strength indication (RSSI) detector; (b) a relative RSSI detector; and/or (c) a frequency offset detector. The method further includes demodulating the transmitted signal to provide a demodulated signal, and detecting a synchronization word in the demodulated signal.

BRIEF DESCRIPTION OF THE DRAWINGS

The appended drawings illustrate only exemplary embodiments and therefore should not be considered as limiting the scope of the application or the claims. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to communication circuitry, such as RF receivers or transceivers. More specifically, the disclosed concepts provide apparatus and methods for receivers with digital signal arrival (DSA) circuits or detectors, which detect the arrival of a transmitted signal, for example, a transmitted frame, packet, etc. In exemplary embodiments, DSAs may be used in a variety of receivers. As merely one example, DSAs according to exemplary embodiments may be used in receivers that use continuous phase modulation (CPM) techniques and associated demodulators.

Figure 1:
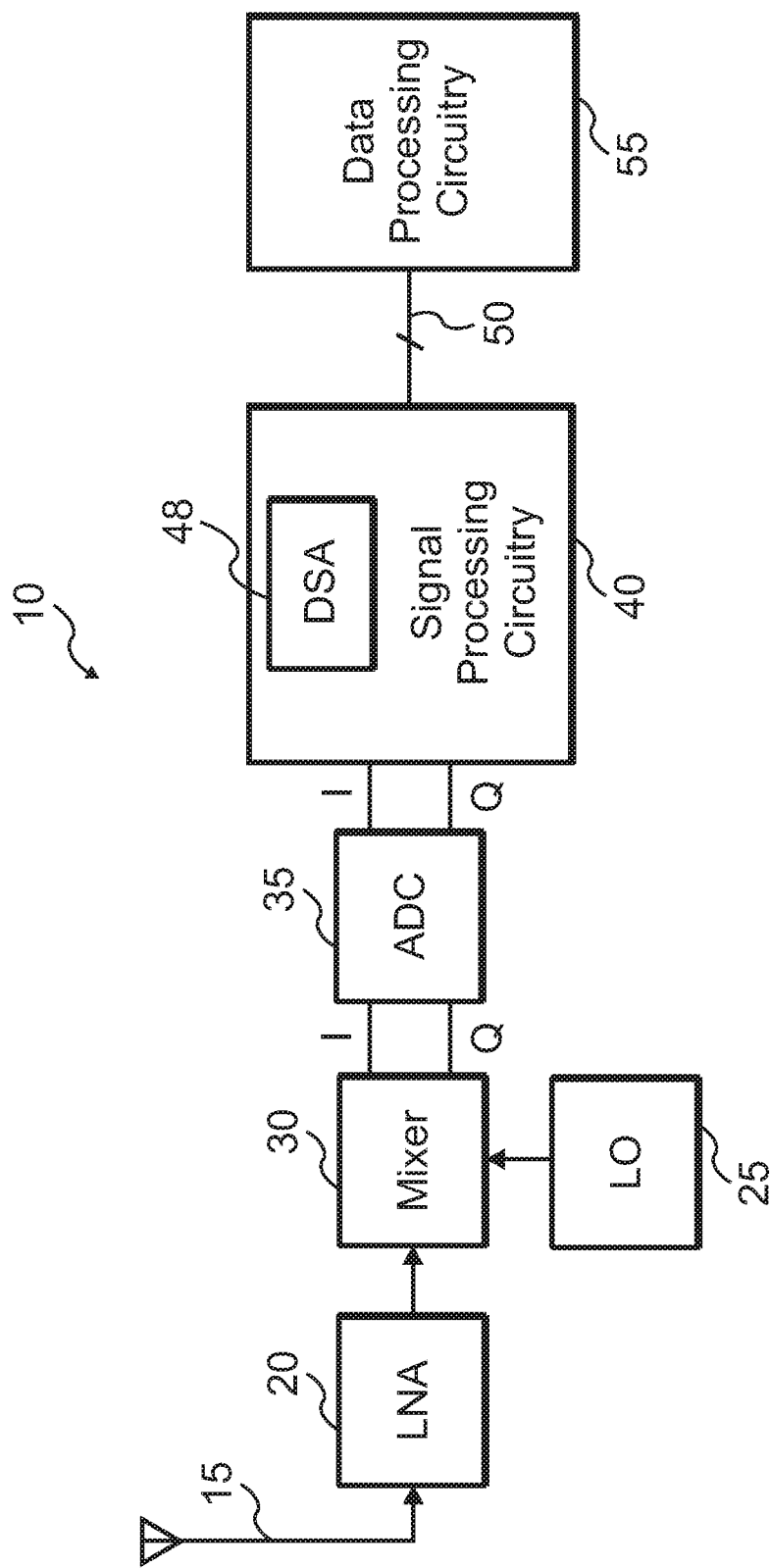
FIG. 1 illustrates a circuit arrangement for a receiver according to an exemplary embodiment.

FIG. 1 illustrates a circuit arrangement for a receiver 10 according to an exemplary embodiment. Receiver 10 receives RF signals via antenna 15. The RF signals feed an input of low noise amplifier (LNA) 20. LNA 20 provides low-noise amplification of the RF signals, and provides amplified RF signals to mixer 30.

Mixer 30 performs frequency translation or shifting of the RF signals, using a reference or local oscillator (LO) frequency provided by LO 25. For example, in some embodiments, mixer 30 translates the RF signal frequencies to baseband frequencies. As another example, in some embodiments, mixer 30 translates the RF signal frequencies to an intermediate frequency (IF).

Mixer 30 provides the translated output signal as a set of two signals, an in-phase (I) signal, and a quadrature (Q) signal. The I and Q signals are analog time-domain signals. Analog to digital converter (ADC) 35 converts the I and Q signals to digital I and Q signals. In exemplary embodiments, ADC 35 may use a variety of signal conversion techniques. For example, in some embodiments, ADC 35 may use delta-sigma (or sometimes called sigma-delta) analog to digital conversion.

ADC 35 provides the digital I and Q signals to signal processing circuitry 40. Generally speaking, signal processing circuitry 40 performs processing on the digital I and Q signals, for example, digital signal processing (DSP). In exemplary embodiments, signal processing circuitry 40 includes DSA 48. DSA 48, described below in detail, detects arrival of a signal communicated via an RF link, i.e., via RF signals received by antenna 15.

Signal processing circuitry 40 provides information, such as the demodulated data, to data processing circuitry 55 via link 50. Data processing circuitry 55 may perform a variety of functions (e.g., logic, arithmetic, etc.). For example, data processing circuitry 55 may use the demodulated data in a program, routine, or algorithm (whether in software, firmware, hardware, or a combination) to perform desired control or data processing tasks.

In some embodiments, data processing circuitry 55 may perform control of other circuitry, sub-system, or systems (not shown). In some embodiments, data processing circuitry 55 may provide the data (after processing, as desired, for example, filtering) to another circuit (not shown), such as a transducer, display, etc.

In exemplary embodiments, link 50 may take a variety of forms. For example, in some embodiments, link 50 may constitute a number of conductors or coupling mechanisms, such as wires, cables, printed circuit board (PCB) traces, etc.

Through link 50, signal processing circuitry 40 and data processing circuitry 55 may exchange information, such as the demodulated data, control information or signals, status signals, etc., as desired.

Figure 2:
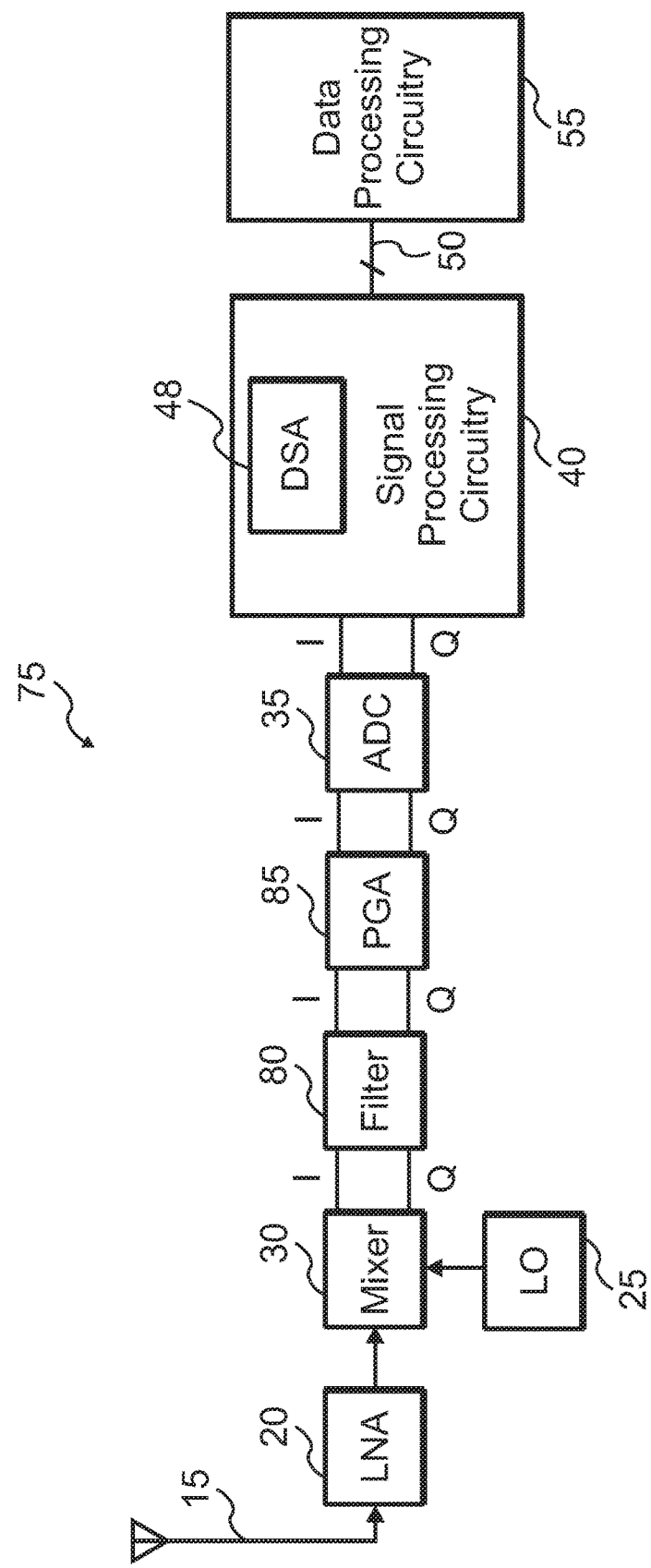
FIG. 2 depicts a circuit arrangement for a receiver according to an exemplary embodiment.

FIG. 2 depicts a circuit arrangement for a receiver 75 according to an exemplary embodiment. Receiver 75 generally has a similar architecture as does receiver 10 (see FIG. 1). Thus, similar to the receiver in FIG. 1, receiver 75 in FIG. 2 includes DSA 48. Referring again to FIG. 2, receiver 75 includes a filter 80 and a programmable gain amplifier (PGA) 85. Filter 80 provides filtering of the RF or baseband signal at the output of mixer 30. PGA 85 provides programmable gain for the filtered signal at the output of filter 80.

In some embodiments, PGA 85 has a gain that is programmable for different input levels of the RF signals received by antenna 15. In some embodiments, PGA 85 has a gain that is programmable for different frequency bands of the RF signals received by antenna 15. In some embodiments, PGA 85 may include more than one stage of amplification, for example, two or more "slices" of amplifier circuitry coupled in a cascade configuration, as desired. The gain of the various stages may be programmed in a similar or independent manner, as desired.

Note that variations of receiver 75 are possible and contemplated in exemplary embodiments. For example, in some embodiments, receiver 75 may include filter 80, but not PGA 85. Conversely, as another example, in some embodiments, receiver 75 may include PGA 85, but not filter 80. Conversely, as yet another example, in some embodiments, receiver 75 may swap the order of PGA 85 and filter 80. Other possibilities exist, for example, including one or more filters between antenna 15 and LNA 20 to facilitate accommodating several RF signal bands, etc.

Figure 3:
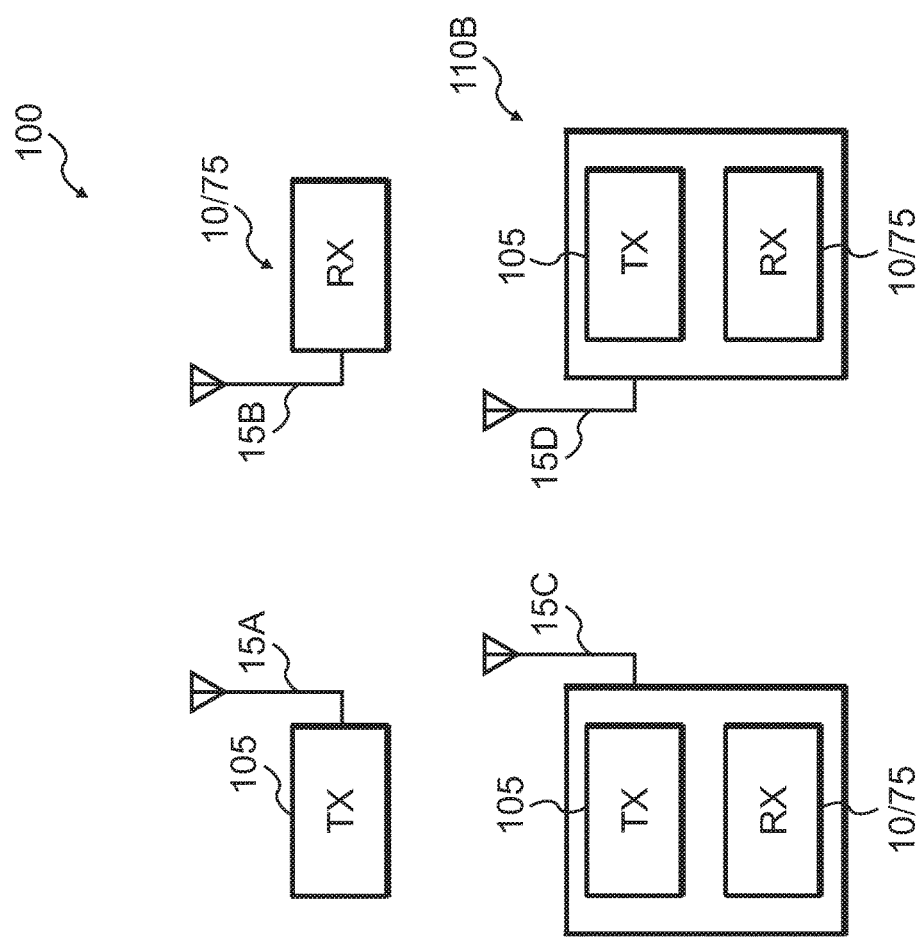
FIG. 3 shows a system for radio communication according to an exemplary embodiment.

Receivers according to exemplary embodiments may be used in a variety of communication arrangements, systems, sub-systems, networks, etc., as desired. FIG. 3 shows a system 100 for radio communication according to an exemplary embodiment.

System 100 includes a transmitter 105, coupled to antenna 15A. Via antenna 15A, transmitter 105 transmits RF signals. The RF signals may be received by receiver 10, described above (alternatively, the receiver may constitute receiver 75, also described above). In addition, or alternatively, transceiver 110A and/or transceiver 110B might receive (via receiver 10 or 75) the transmitted RF signals.

In addition to receive capability, transceiver 110A and transceiver 110B can also transmit RF signals. The transmitted RF signals might be received by receiver 10 or 75, either in the stand-alone receiver, or via the receiver circuitry of the non-transmitting transceiver.

Other systems or sub-systems with varying configuration and/or capabilities are also contemplated. For example, in some exemplary embodiments, two or more transceivers (e.g., transceiver 110A and transceiver 110B) might form a network, such as an ad-hoc network. As another example, in some exemplary embodiments, transceiver 110A and transceiver 110B might form part of a network, for example, in conjunction with transmitter 105.

Figure 4:
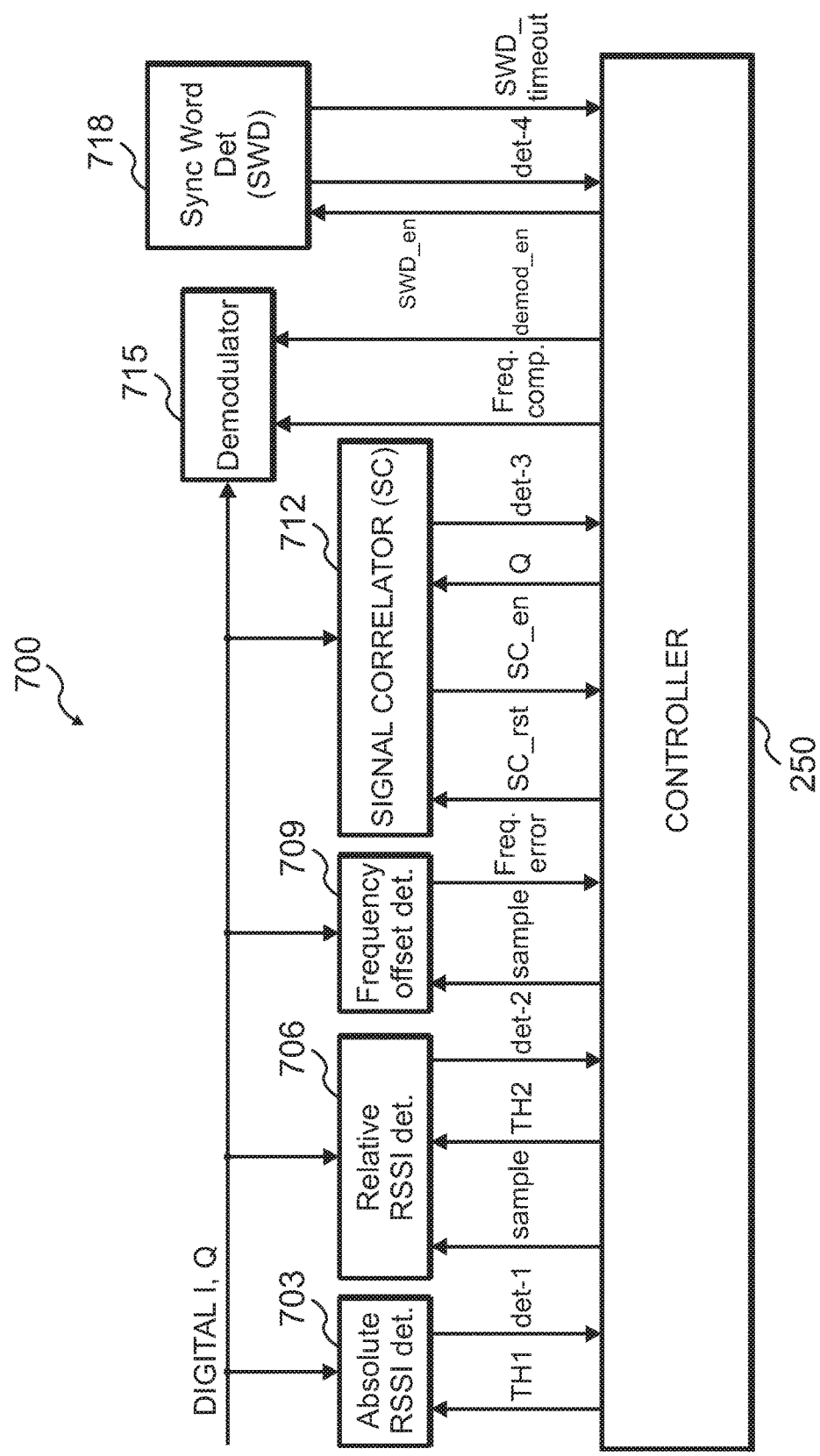
FIG. 4 illustrates receive path circuitry, including DSA circuitry, according to an exemplary embodiment.

FIG. 4 illustrates a receive-path circuit arrangement 700 for an RF receiver that includes DSA circuitry according to an exemplary embodiment. Circuit arrangement 700 includes controller 250, which controls the operations of various blocks or circuits, such as absolute RSSI detector 703, relative RSSI detector 706, frequency offset detector 709, signal correlator (SC) 712, demodulator 715, and synchronization (SYNC or Sync) word detector (SWD) 718, as described below in detail.

A set of digital in-phase (I) and quadrature (Q) signals, for example, derived from ADC 35 in FIGS. 1-2, drives various blocks in circuit arrangement 700, including absolute RSSI detector 703, relative RSSI detector 706, frequency offset detector 709, signal correlator (SC) 712, and demodulator 715. Demodulator 715 demodulates the received I and Q signals to generate demodulated signals. Controller 250 uses the Demod_en signal to enable or disable demodulator 715. In addition to the I and Q signals, demodulator 715 receives a frequency compensation signal from controller 250. Demodulator 715 uses the frequency compensation signal to correct for frequency errors, for example, errors related to aging, variations between the respective frequencies of transmitter and receiver reference signal sources, etc. Demodulator 715 may perform demodulation in a variety of ways and may include various circuitry, as persons of ordinary skill in the art will understand. As merely one example, related U.S. patent application Ser. No. 15/164,363, referenced above, describes a CPM demodulator.

SWD 718 uses the demodulated output of demodulator 715 to detect the sync word or Access Address or any other pattern that links the data stream to the payload data. Controller 250 uses an SWD_en signal to enable or disable SWD 718. If SWD 718 detects a sync word, it provides a "det-4" signal to controller 250. Signal "det-4" indicates that SWD 718 has triggered on a sync word pattern. SWD 718 helps the RF receiver to find the first symbol belonging to the desired information stream, for example, an information stream that represents the desired payload. If SWD 718 fails to detect a sync word within a given (e.g., prescribed, programmed, etc.) amount of time, SWD 718 provides an SWD_timeout signal to controller 250. The timeout is usually implemented via a timer that is started when SWD_en is asserted by controller 250.

The DSA circuitry includes absolute RSSI detector 703, relative RSSI detector 706, frequency offset detector 709, and SC 712. Note that exemplary embodiments of the DSA circuit may include SC 712 and absolute RSSI detector 703, relative RSSI detector 706, and/or frequency offset detector 709. In other words, in some embodiments, the DSA circuit may include SC 712 and absolute RSSI detector 703, whereas other embodiments may include SC 712 and relative RSSI detector 706, and yet other embodiments may include SC 712 and frequency offset detector 709. Additional embodiments may include combinations of various circuitry, such as: (a) SC 712, absolute RSSI detector 703 and relative RSSI detector; (b) SC 712, relative RSSI detector 706, and frequency offset detector 709; (c) SC 712, absolute RSSI detector 703, and frequency offset detector 709; etc. Thus, in exemplary embodiments, DSA circuits having a flexible combination of SC 712 and one or more of absolute RSSI detector 703, relative RSSI detector 706, and frequency offset detector 709 may be implemented depending on factors such as design and performance specifications, cost, available technology, and the like, as persons of ordinary skill in the art will understand.

The operation of each circuit block is described in detail below. In some embodiments, the DSA circuit uses absolute RSSI detector 703 to enable (start from reset), or start, or qualify the operation of SC 712. Relative RSSI detector 706 is also used in some embodiments to enable or qualify SC 712. Detectors (e.g., SC 712 or SWD 718) or demodulator 715 may be disabled when RSSI is below a given or prescribed threshold in order to reduce the overall power consumption of the receiver. Frequency offset detector 709 determines a frequency error that may result because of a variety of reasons, for example, difference in frequencies of reference signals in the transmitter and receiver, aging effects (e.g., when crystal oscillators are used), temperature effects, component drift, etc.). SC 712 is disqualified when the frequency offset (as detected by frequency offset detector 709) exceeds a limit or threshold. The DSA may be used to measure several frequency offsets in separate windows in order to remove outlier(s), as described below in more detail.

Controller 250 provides threshold value "TH1" (a receiver design or operation parameter) to absolute RSSI detector 703. Absolute RSSI detector 703 compares the strength (e.g., magnitude or other measure) of the received signal (as represented by the digital I and Q signal) to threshold TH1. If the strength of the received signal exceed threshold TH1, absolute RSSI detector 703 provides output signal "det-1" (detect-1) to controller 250.

Similarly, controller 250 provides threshold value "TH2" (a receiver design or operation parameter) to relative RSSI detector 706. In response to controller 250 asserting a "Sample" signal (provided to relative RSSI detector 706) relative RSSI detector 706 subtracts the strength (e.g., magnitude or other measure) of the received signal to from the strength of a previously received signal. If the if the difference between the current and the previous strength exceeds threshold TH2, relative RSSI detector 706 provides output signal "det-2" to controller 250. In addition, in some embodiments, relative RSSI detector 706 may provide a "det-2*" signal (not shown) to controller 250, as described below in detail.

In response to controller 250 asserting a "Sample" signal (provided to frequency offset detector 709), frequency offset detector 709 provides a frequency error that may be present in the received signal and/or the receiver circuitry. Frequency offset detector 709 provides a "Freq error" signal to controller 250. The "Freq error" signal provides to controller 250 a measure of the frequency error, as determined by frequency offset detector 709.

SC 712 provides detection of a valid received signal. In addition, SC 712 may find symbol timing synchronization. SC 712 may be implemented in a variety of ways, as persons of ordinary skill in the art will understand. Examples include IQ-based signal arrival detector that detects symbols, phase-based signal arrival detector, preamble pattern detector, or any other type of detector that finds the start of a data packet. The choice of circuitry for a given implementation depends on a variety of factors, as persons of ordinary skill in the art will understand. Such factors include design specifications, performance specifications, cost, IC or device area, available technology, such as semiconductor fabrication technology, target markets, target end-users, etc.

SC 712, as depicted in FIG. 4, represents a generalized signal correlator. SC 712 has 4 input/output signals. Signal "SC_rst" is a reset signal that controller 250 provides to SC 712 to reset the signal correlator circuitry. Signal "SC_en" is an input signal that controller 250 provides to SC 712 to enable the operations of SC 712. The "Q" (qualifier) signal is an input signal that controller 250 provides to SC 712 to qualify the signal correlation and detection (or disqualify the signal correlation and detection). For example, if absolute RSSI detector 703, relative RSSI detector 706, or both, trigger (as evidenced by signals det-1 and det-2, respectively), controller 250 uses the Q signal to inform SC 712 that a trigger even has occurred. The "det-3" signal is an output signal from SC 712 to controller 250. Through signal det-3, SC 712 notifies controller 250 that the signal correlation operation has detected a valid signal.

In exemplary embodiments, RSSI processing by absolute RSSI detector 703 or absolute RSSI detector 703 may be performed in a variety of ways, as desired. Examples include: (a) a logarithmic or linear version of the base power or amplitude level of the received signal; (b) an unfiltered or filtered version of the base power or amplitude level of the received signal; (c) a filtered version of the logarithmic power or the amplitude level, where the filter has a low pass frequency response or a relatively fast attack and relatively slow decay characteristics.

As noted, absolute RSSI detection, as performed by absolute RSSI detector 703, is used by controller 250 to enable, start, or qualify signal correlation detection (performed by SC 712). Use of absolute RSSI detector 703 helps to reduce false-positive detections by SC 712. Thus, use of absolute RSSI detector 703 helps to reduce the power consumption of the RF receiver when absolute RSSI detector 703 is not triggering. Furthermore, additional detectors and circuitry (e.g., relative RSSI detector 706) may be enabled after absolute RSSI detector 703 has triggered (as signified by signal det-1, described above). Thus, while absolute RSSI detector 703 has not triggered, additional detectors and circuitry may be disabled, prevented from sampling the received signal, etc., further reducing the power consumption of the RF receiver.

Furthermore, as noted, relative RSSI detection, as performed by relative RSSI detector 706, is used by controller 250 to enable, reset, start, or qualify signal correlation detection (performed by SC 712). Using relative RSSI detector 706 to qualify, start, or enable SC 712 reduces false-positive detections by SC 712. Relative RSSI detector 706 may also be used to reset circuitry in controller 250, for example, a finite state machine (FSM). Resetting circuitry in controller 250 may result a reset of one or more blocks in the RF receiver, for example, SC 712, SWD 718, etc.

Relative RSSI detector 706 compares an earlier RSSI (ER) level or value or signal with the current RSSI (CR) level or value or signal. When the CR level exceeds the ER level by the amount represented by threshold TH2, relative RSSI detector 706 asserts signal det-2. The ER level may be obtained at any time instant, for example, when relative RSSI detector 706 samples the input signal in response to the "Sample" signal. Other possibilities are contemplated. For example, in some embodiments, the ER sample is taken when SWD 718 asserts the SWD_timeout signal.

Figure 5:
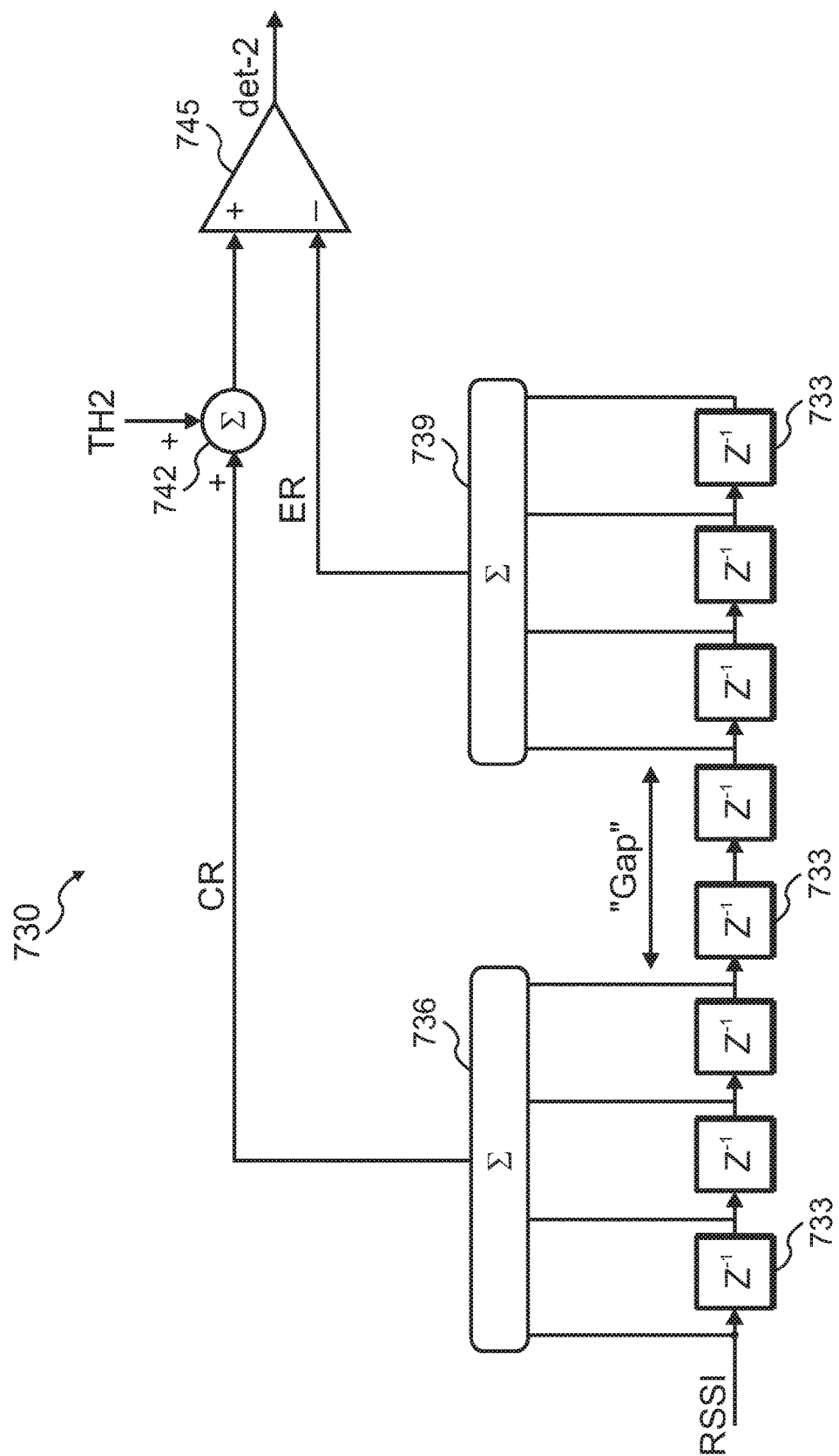
FIG. 5 depicts a circuit arrangement used by a relative received signal strength indication (RSSI) detector according to an exemplary embodiment.

In other embodiments, rather than using the "Sample" signal, a finite-impulse-response (FIR) filter is used. FIG. 5 shows a circuit arrangement 730 according to an exemplary embodiment that uses a FIR filter. The FIR filter includes a number of delay circuits 733 coupled in a cascade configuration (boxcar configuration). The FIR provides noise and amplitude modulation (AM) filtering, as persons of ordinary skill in the art will understand.

Some of delay circuits 733 are used, together with adder 736, to provide the ER signal. More specifically, the RSSI signal (as determined by other circuitry in relative RSSI detector 706) feeds an input of the first delay circuit 733. The output of the first delay circuit 733 feeds the input of a follow-on delay circuit 733, and so on. In the embodiment shown, the RSSI signal and the outputs of the first three delay circuits 733 provide four input signals to adder 736. Adder 736 adds the four input signals to generate the CR signal as an output.

Some of delay circuits 733 are used, together with adder 739, to provide the ER signal. The output of the fourth delay circuit 733 that is used to generate the ER signal is fed to follow-on delay circuits 733. The outputs of some of the follow-on delay circuits 733 (four in the example shown) are provided as inputs to adder 739. Adder 739 adds the four input signals to generate the ER signal as an output. In some embodiments, the tap positions of the FIR window and the number of delay circuits captured by the CR and ER signals are selected to corresponds to the time period it takes SC 712 to detect the arrival of a signal.

In exemplary embodiments, delay circuits 733 may be operated at an over-sampled rate (several samples per symbol) or at the symbol rate, or at several symbols per delay circuit ($Z^{-1}$), as desired. In exemplary embodiments, the tap positions of the FIR filter are selected such that the delay circuits used to determine the ER signal receive and process the RSSI signal before the actual signal or packet arrival. Note that the outputs of some delay circuits 733 (two in the example shown) are not fed to either adder 736 or adder 739. Thus, a "gap" (as represented by two delay circuits 733 in the example of FIG. 5) exists between the delay circuits 733 used to generate the ER and CR signals. The "gap" separates the delay circuits used to calculate the ER signal from the delay circuits used to calculate the CR signal and helps to suppress the diluting effect of transmitter power ramping.

In some embodiments, different numbers of delay circuits 733 may be used to calculate the ER and CR signals than shown in the embodiment in FIG. 5. Increasing the number of delay circuits 733 improves the filtering of noise and AM, as persons of ordinary skill in the art will understand. Furthermore, the number of the respective delays circuits 733 used to calculate the ER and CR signals may be different (i.e., not both equal to four, in the embodiment shown). In some embodiments, the "gap" may be larger or smaller than shown in FIG. 5. For instance, in some embodiments, the gap may be zero to several symbols so that the ER signal does not carry energy from the received packet and the CR signal does not carry energy from the received noise.

Figure 6:
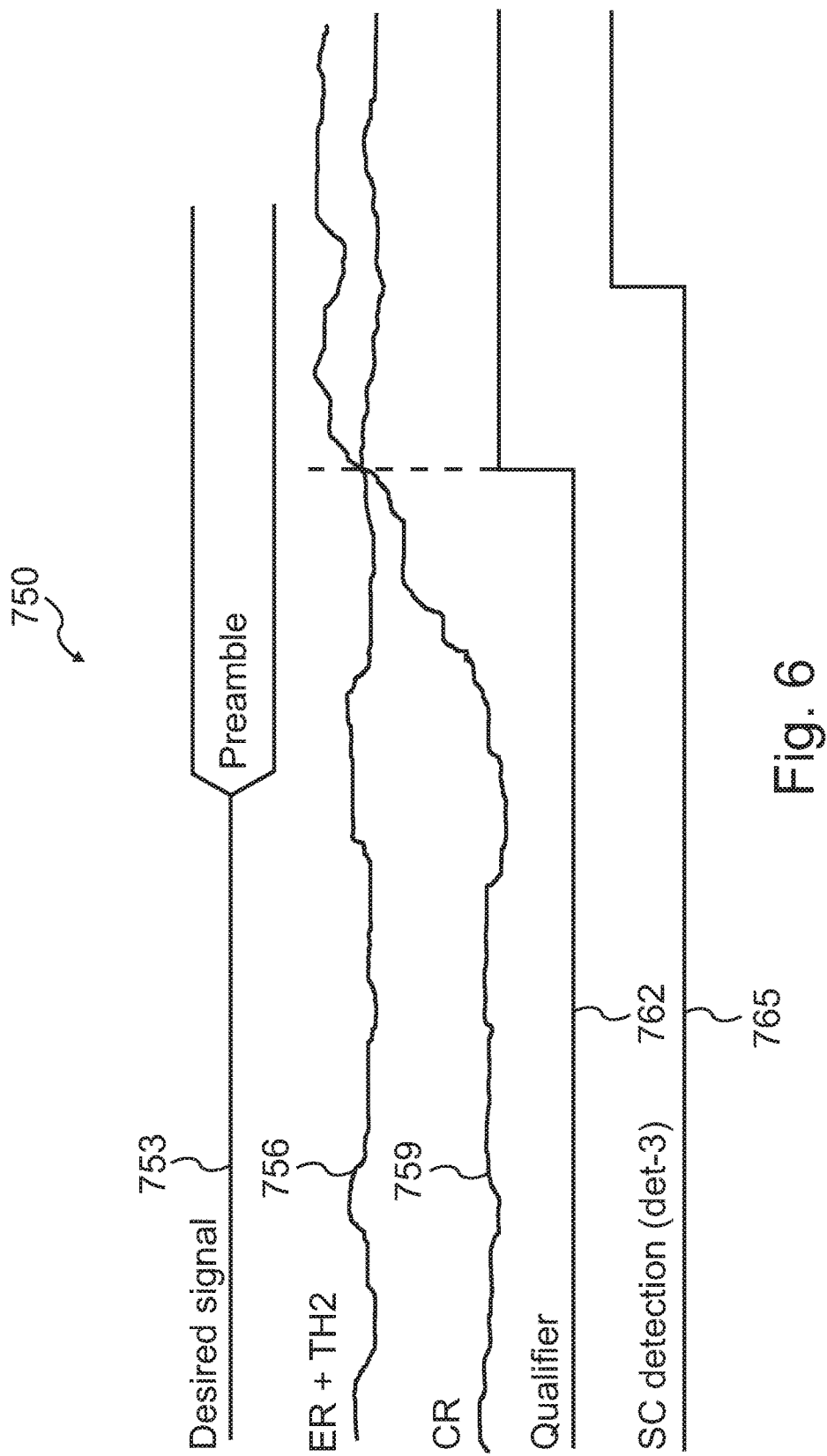
FIG. 6 shows a plot of waveforms corresponding to the operation of the circuit in FIG. 5 according to an exemplary embodiment.

An adder 742 adds together the threshold value TH2 and the ER signal. The result of the add operation is provided to comparator 745 as an input signal. The CR signal is provided to comparator 745 as another input signal. Comparator 745 asserts its output signal det-2 when the level of the CR signal exceeds the threshold value TH2. FIG. 6 shows a plot 750 of waveforms corresponding to the operation of the circuit in FIG. 5 according to an exemplary embodiment. More specifically, plot 750 shows a desired signal 753, which includes a preamble. Plot 750 further shows a waveform 756 that represents the sum of the ER and TH2 signals, in addition to a waveform 759 that denotes the CR signal.

When waveform 759 crosses waveform 756 (i.e., the CR signal exceeds the sum of the ER and TH2 signals), the "Q" signal is asserted, indicated as a transition from logic low to logic high in waveform 762. Subsequently, SC 712 detects the desired signal, as denoted by the logic low to logic high transition of waveform 765, which represents the det-3 output signal of SC 712. Once det-3 is asserted, the CR signal can be sampled and used to replace or update the ER signal. Consequently, comparator 745 (see FIG. 5) may detect a stronger interferer and reset the receiver state machine in controller 250 (see FIG. 4) so that the stronger signal (corresponding to the CR signal) can be received. A detect signal indicating detection of the stronger signal is denoted as "det-2\*" in FIGS. 7-8 described below in detail.

Referring again to FIG. 4, as noted above, when the RSSI level is below a given or desired or prescribed threshold (a receiver design or operation parameter), controller 250 may decide to disable one or more of the detectors, for example, absolute RSSI detector 703, relative RSSI detector 706, and frequency offset detector 709 (generally, controller 250 leaves enabled one of the detectors so that RSSI levels may be determined).

Furthermore, when the frequency offset, as determined by frequency offset detector 709, exceeds a given or desired or prescribed limit or threshold (a receiver design or operation parameter), SC 712 may be disqualified or controller 250 may be reset. More specifically, frequency offset detector 709 may measure a frequency error that is outside a valid range (the frequency error is ideally zero, which indicates that the transmitter and receiver are using respective reference signals that have the same frequency). If a frequency error exists, it might result from a condition in the transmitter or in the receiver. Given that the operating specifications (e.g., reference signal frequency) for the receiver are known, a determination may be made whether the frequency offset or error is larger than prescribed in the specifications. If so, either a condition in the transmitter exists that causes the frequency error, or the receiver has not detected the correct signal (i.e., the transmitted signal).

The frequency error being outside a valid range may result from a number of conditions, for example, when a strong out of channel interferer is present. When the frequency error is outside the valid range, it is likely that no valid packet or signal can be received. In this case, disqualifying SC 712 (or any detector whose output signal(s) are used to qualify SC 712) or resetting controller 250 helps to prevent false-positive triggers or signal detections (e.g., by SC 712).

The frequency error may be determined in a number of ways, as persons of ordinary skill in the art will understand. For example, in some receivers, a Coordinate Rotation Digital Computer (Cordic) circuit to receive a complex signal derived from RF signals and to generate a phase signal. The phase signal is differentiated to generate a frequency signal, from which the frequency offset or error is determined.

As noted above, in some embodiments, several frequency offsets or errors are measured in separate windows and one or more outlier values are removed. For example, frequency offset detector 709 may measure the frequency error in several consecutive bins (e.g., three frequency error measurements of two-symbol durations each, although other numbers may be used, as desired). The start of the consecutive measurements may be linked to (or conditioned or based on) to detection of a signal by SC 712 (e.g., when signal det-3 is asserted). Because of noise and interference, the time instance of signal detection by SC 712 may experience or include some jitter relative to the received packet. The jitter may cause one of the frequency error measurements to coincide with the sync word, which may result in faulty or inaccurate frequency error results.

By correlating several (e.g., three frequency error measurements of two-symbol durations each) frequency error measurements, the outlier frequency error measurement(s) can be eliminated from the final frequency error result or assessment. Doing so improves the accuracy of the final frequency error measurement or result under noisy channel conditions.

Figure 7:
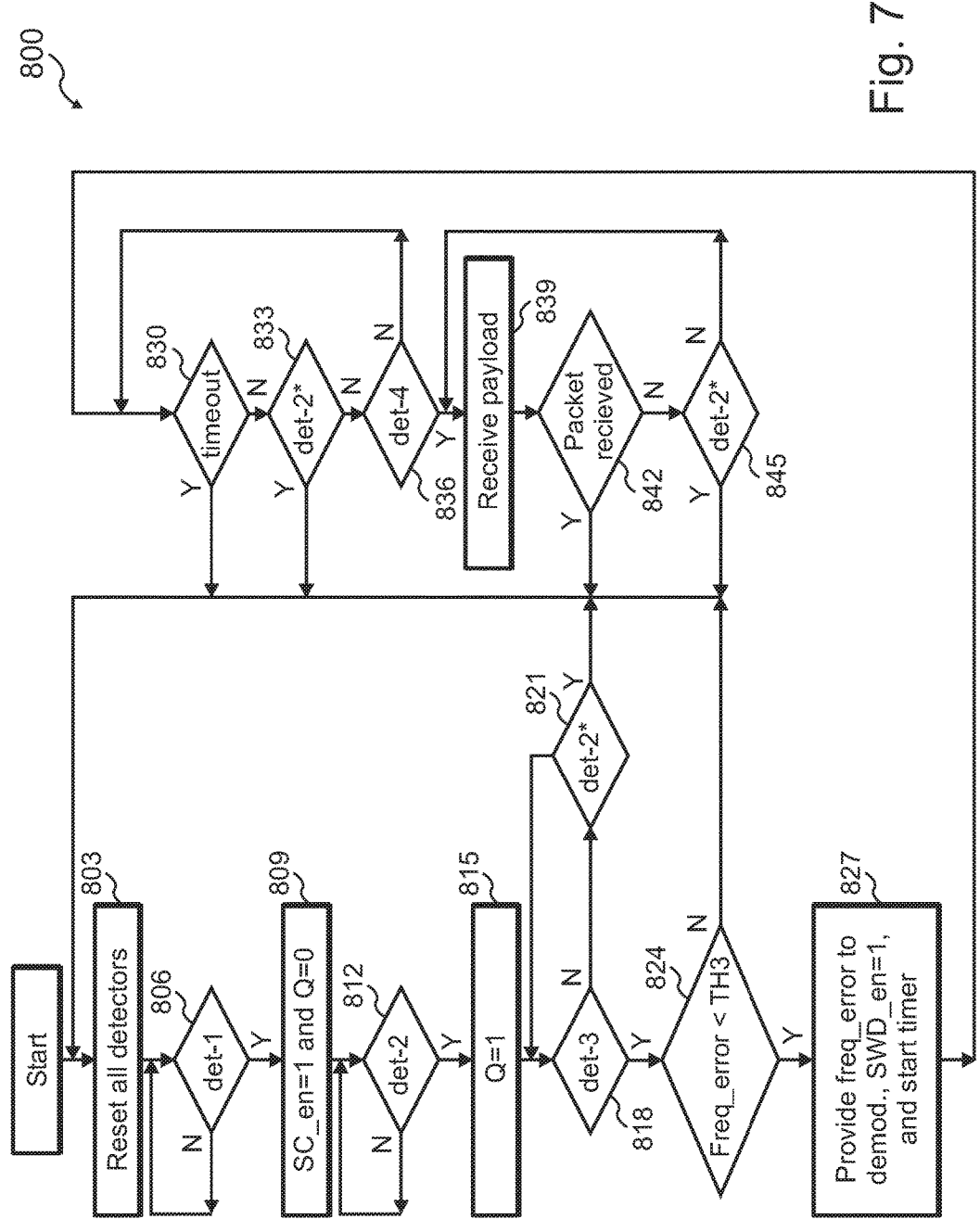
FIG. 7 illustrates a flowchart for a process of detecting signal arrival according to an exemplary embodiment.
Figure 8:
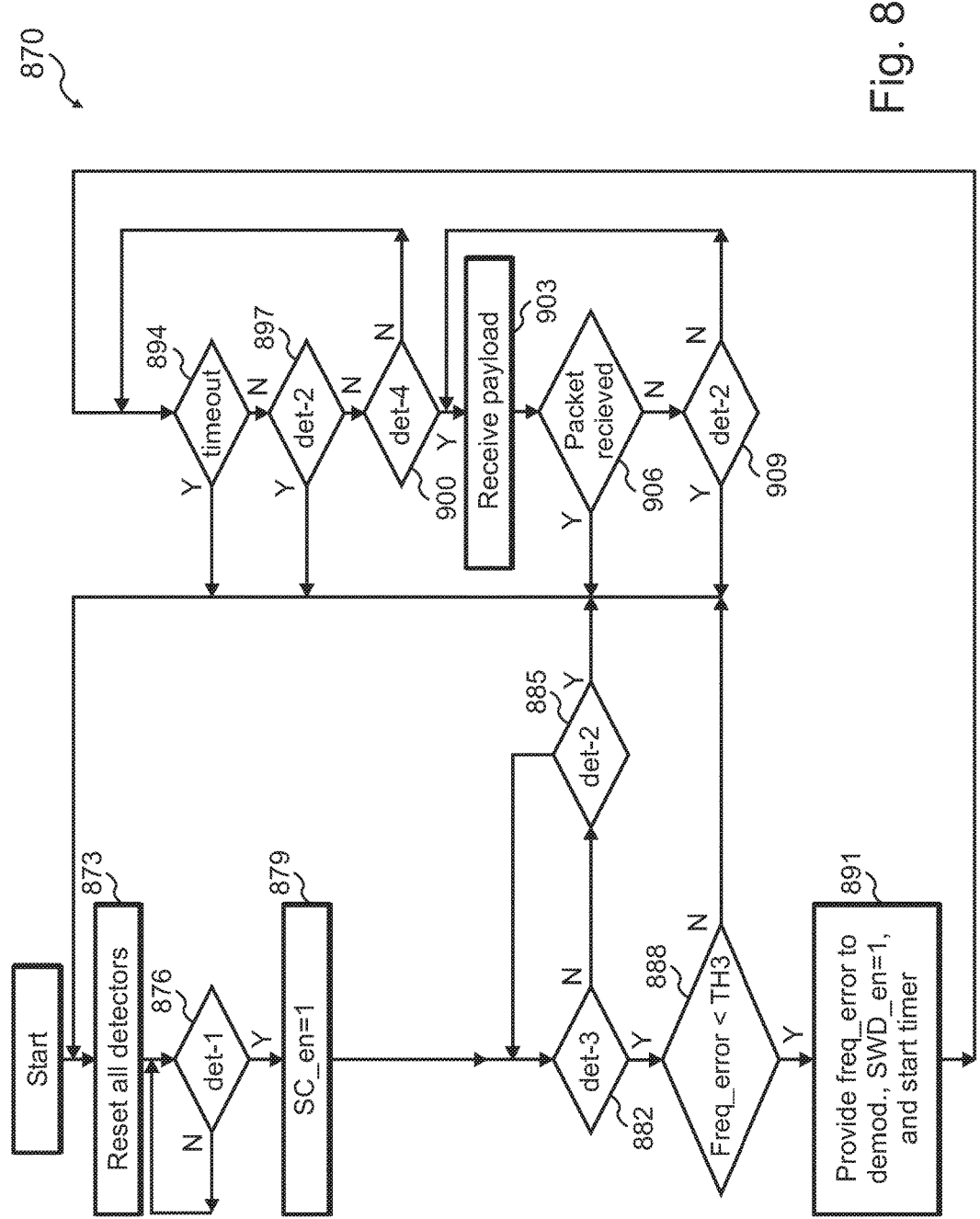
FIG. 8 depicts a flowchart for another process of detecting signal arrival according to an exemplary embodiment.

As noted, in exemplary embodiments, a variety of techniques may be used to detect signal arrival using DSAs. FIGS. 7-8 provide two examples. More specifically, FIG. 7 illustrates a flowchart for a process 800 of detecting signal arrival according to an exemplary embodiment. In process 800, the det-2* signal (e.g., as provided by relative RSSI detector 706 in FIG. 4) and modified ER signals, as described above, are used in an exit strategy to detect false positive detections. In addition, the exit strategy for process 800 checks for excessive frequency errors, for example, frequency error measurements that fall outside a valid range. Referring again to FIG. 7, at 803, all detectors (see, for example, FIG. 4) are reset. At 806, a check is made whether the det-1 signal has been asserted. If not, the checking continues at 806. If the det-1 signal has been asserted, at 809, the SC_en signal is asserted (set to logic one or high), and the "Q" signal is de-asserted (set to logic zero or low) to inform the signal correlator (e.g., SC 712 in FIG. 4).

At 812, a check is made whether the det-2 signal has been asserted. If not, he checking continues at 812. If the det-2 signal has been asserted, at 815 the "Q" signal is asserted (set to logic one or high) to inform or qualify the signal correlator (e.g., SC 712 in FIG. 4). At 818, a check is made whether the det-3 signal has been asserted. If not (signal correlator has not detected a valid signal), a check is made at 821 whether the det-2* signal has been asserted. If so, control returns to 803, and the detectors are reset again, as described above. If, however, the det-2* signal has not asserted, then control returns to 818.

If, however, the check at 818 determines that the det-3 signal has been asserted, then at 824 a check is made whether the frequency error is less than threshold TH3. If not (indicating relatively high frequency error), control returns to 803, and the detectors are reset again, as described above. If, however, the frequency error is less than threshold TH3, at 827 the frequency error value is provided to the demodulator, SWD_en is asserted, and the SWD timeout timer is started.

At 830, a check is made whether the SWD timer has timed out. If so, control returns to 803, and the detectors are reset again, as described above. If not, at 833 a check is made whether the det-2* signal has been asserted. If so, control returns to 803, and the detectors are reset again, as described above. If not, a check is made at 836 whether the det-4 signal has been asserted (e.g., by SWD 718 in FIG. 4). If not, control returns to 830 to check whether an SWD timeout has occurred.

If, however, the det-4 signal has been asserted, at 839 the payload is received. At 842, a check is made whether the packet is received. If so, control returns to 803, and the detectors are reset to prepare for the reception of any additional transmitted information. If not, at 845 a check is made whether the det-2* signal has been asserted. If so, control returns to 803, and the detectors are reset again, as described above. If not, control returns to 839.

FIG. 8 depicts a flowchart for a process 870 of detecting signal arrival according to an exemplary embodiment. In process 870, the det-2* signal (e.g., as provided by relative RSSI detector 706 in FIG. 4) is used in an exit strategy to detect false positive detections. In addition, the exit strategy for process 870 checks for excessive frequency errors, for example, frequency error measurements that fall outside a valid range. Referring again to FIG. 8, at 873, all detectors (see, for example, FIG. 4) are reset. At 876, a check is made whether the det-1 signal has been asserted. If not, the checking continues at 876. If the det-1 signal has been asserted, at 879, the SC_en signal is asserted.

At 882, a check is made whether the det-3 signal has been asserted. If not, at 885 a check is made at 821 whether the det-2 signal has been asserted. If so, control returns to 873, and the detectors are reset again, as described above. If, however, the det-2 signal has not asserted, then control returns to 882. Referring again to the check at 882, if the det-3 signal has been asserted, at 888 a check is made whether the frequency error is less than threshold TH3. If not (indicating relatively high frequency error), control returns to 873, and the detectors are reset again, as described above. If, however, the frequency error is less than threshold TH3, at 891 the frequency error value is provided to the demodulator, SWD_en is asserted, and the SWD timeout timer is started.

At 894, a check is made whether the SWD timer has timed out. If so, control returns to 873, and the detectors are reset again, as described above. If not, at 897 a check is made whether the det-2 signal has been asserted. If so, control returns to 873, and the detectors are reset again, as described above. If not, at 900 a check is made whether the det-4 signal has been asserted (e.g., by SWD 718 in FIG. 4). If not, control returns to 894 to check whether an SWD timeout has occurred.

If, however, the det-4 signal has been asserted, at 903 the payload is received. At 906, a check is made whether the packet is received. If so, control returns to 873, and the detectors are reset to prepare for the reception of any additional transmitted information. If not, at 909 a check is made whether the det-2 signal has been asserted. If so, control returns to 873, and the detectors are reset again, as described above. If not, control returns to 903.

Figure 9:
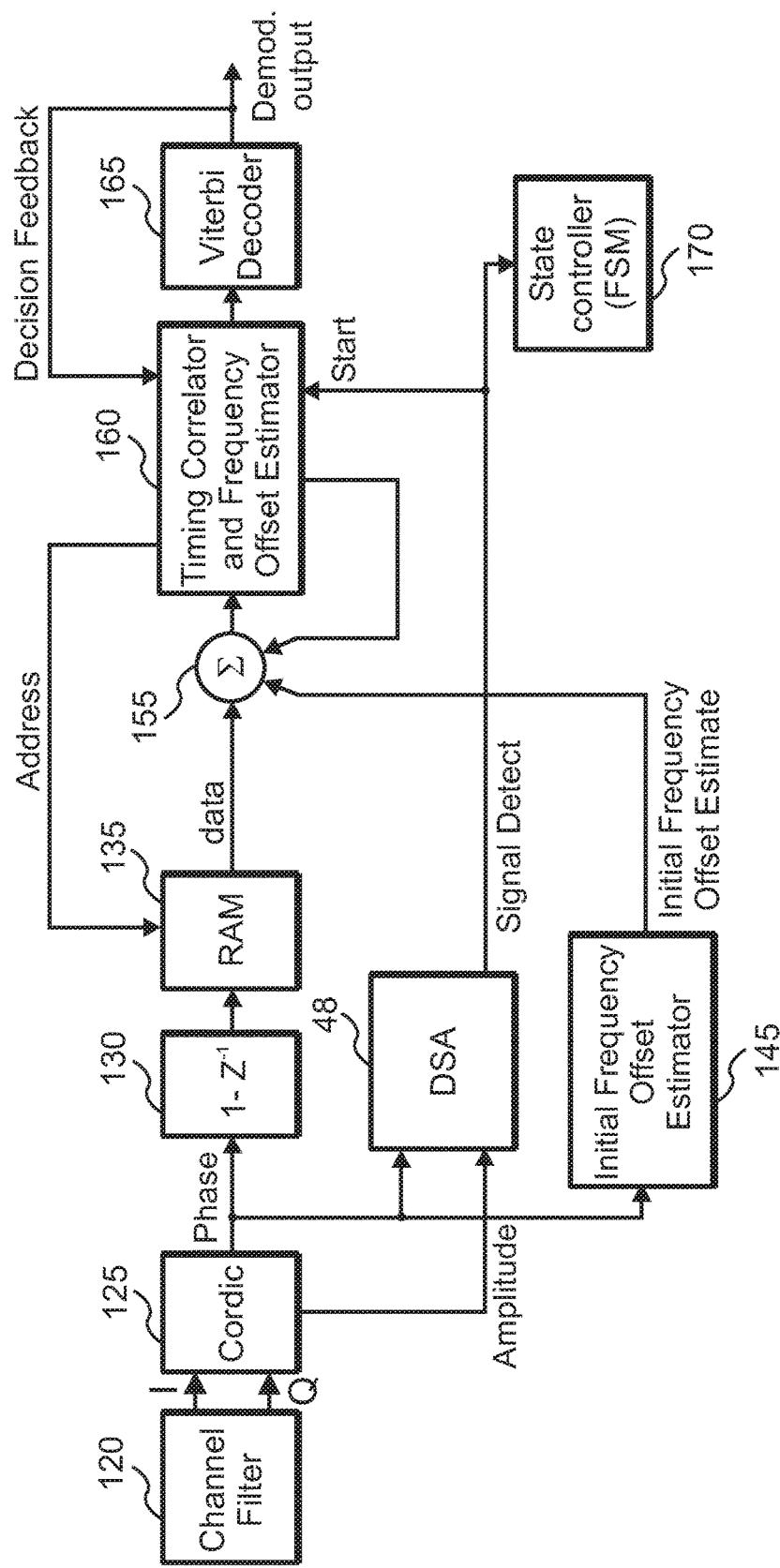
FIG. 9 shows a circuit arrangement for receive path circuitry including a DSA circuit according to an exemplary embodiment.

As noted, RF receivers using the disclosed DSAs may have a variety of architectures and circuitry. One example includes RF receivers that use continuous phase modulation (CPM). FIG. 9 depicts a circuit arrangement for CPM receive path circuitry that includes DSA 48.

The circuit arrangement in FIG. 9 includes an optional channel filter 120. If used, channel filter 120 digitally filters (e.g., low-pass filtering) of an input signal, for example, the I and Q signal derived from ADC 35 (see FIGS. 1, 2). Referring again to FIG. 9, channel filter 120 provides filtered signals I and Q to Cordic (or Cordic circuit) 125. Compared to the data rate (I and Q signals), Cordic 125 is overclocked in order to cause oversampling of the data signals. The input I and Q signals to Cordic 125 are time-domain signals. Cordic 125 coverts the time-domain signals to polar (i.e., phase and amplitude) provided as two respective outputs. More specifically, the phase output of Cordic 125 is provided to phase differentiator 130, whereas both the phase and the amplitude outputs are provided to DSA 48. The phase output of Cordic 125 is also provided to initial frequency offset estimator 145. Phase differentiator 130, having a representative transfer function $1-z^{-1}$, performs phase differentiation of the signal at the phase output of Cordic 125. Phase differentiator 130 provides the differentiated output signal to memory 135 (a random access memory (RAM) in the embodiment shown). Note that in exemplary embodiments phase differentiator 130 operates over symbol or chip intervals at an oversampled rate, not the data rate. Typically the differentiator 130 operates on symbol intervals when no spreading is used and works on chip intervals when spreading is applied.

In response to the phase and amplitude signals from Cordic 125, DSA 48 detects or attempts to detect arrival of a data signal. When a signal is detected, DSA 48 provides via an output a "signal detect" signal to timing correlator and frequency offset estimator 160 and to state controller or FSM (or controller, generally) 170. State controller 170 controls various operations of the CPM demodulator. State controller 170 may receive and use configuration settings (e.g., via one or more configuration registers (not shown) from a host or other device (not shown)), and use those settings to control the operations of the CPM demodulator. In exemplary embodiments, state controller 170 may be implemented as a finite-state machine (FSM), as desired. Other implementations of state controller 170 are also contemplated and possible. Examples include general logic circuitry, processors, custom logic, etc. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

The "signal detect" signal also serves as a start signal for timing correlator and as a freeze signal to freeze the output of frequency offset estimator 160. Thus, until DSA 48 provides an indication of a signal arrival or detection, the timing correlator in timing correlator and frequency offset estimator 160 and Viterbi decoder 165 are not running. As a result, the power consumption of the CPM demodulator and, consequently, of the RF receiver, is reduced. The reduced power consumption may provide longer battery life in mobile applications or reduce the operating costs of the receiver overall.

In some embodiments, DSA 48 examines the eye opening of the input signal to determine whether the input signal constitute a valid signal. In some embodiments, DSA 48 examines or looks for phase spikes (in the phase signal received from Cordic 125). Presence of phase spikes would indicate that a valid signal has not arrived. In some embodiments, DSA 48 examines figures of merit, such as receiver signal strength indication or indicator (RSSI). A combination of the foregoing techniques may be used to perform signal arrival detection, as desired.

Initial frequency offset estimator 145 provides an initial frequency offset estimate to adder 155. The frequency offset occurs because the transmitter (not shown) typically uses an oscillator (e.g., crystal oscillator) whose frequency is not exactly at the center frequency of the channel. Initial frequency offset estimator 145 provides an estimated frequency correction to correct the offset. Initial frequency offset estimator 145 typically detects the average frequency offset by differentiating the phase signal provided by Cordic 125. For example, averaging may be obtained by differentiating subsequent samples and accumulating the differentiated values for two or four symbols long. When the freeze signal is asserted, the last completed accumulation is presented at the output of the initial frequency offset estimator. Initial frequency offset estimator may be implemented in a variety of ways, as persons of ordinary skill in the art will understand. The choice of implementation depends on factors such as design and performance specifications, general receiver architecture, receiver cost, complexity, size, system specifications, and the like, as persons of ordinary skill in the art will understand.

Initial frequency offset estimator 145 operates in response to a "freeze" signal from DSA 48. The "freeze" signal instructs the initial frequency offset estimator 145 to stop examining the phase signal from Cordic 125 and to provide a frequency offset initial estimate to adder 155. Adder 155 receives another input from timing correlator and frequency offset estimator 160. Specifically, timing correlator and frequency offset estimator 160 provides a frequency offset estimate signal to adder 155. The initial frequency offset estimation is frozen when DSA 48 indicates that a signal has been detected (via the "signal detect" signal) and, subsequently, the initial frequency offset estimate (from initial frequency offset estimator 145) is used by the correlator in timing correlator and frequency offset estimator 160 to obtain the initial symbol timing and frequency offset estimate.

Data from RAM 135 drives another input of adder 155. The data are provided in response to address signals provided to RAM 135 from controller 170. RAM 135 receives and stores samples from phase differentiator 130. Because the derivative of phase constitutes frequency, the output of phase differentiator 130 includes frequency data. Thus, the samples stored in RAM 135 represent frequency information. RAM 135 contains over sampled data (differentiated phase over symbol interval at the oversampling rate). After signal arrival is detected (as indicated by DSA 48), the correlator in timing correlator and frequency offset estimator 160 is used to find a minimum cost function.

After DSA 48 detects a signal arrival, frequency information from RAM 135 is added to the frequency offset estimate to provide corrected frequency information to timing correlator and frequency offset estimator 160 and Viterbi decoder 165. DSA 48 might trigger somewhat earlier or later than nominal (for example, because of trigger jitter). An exhaustive search extends the search window to include the expected or worst case trigger jitter. More specifically, timing correlator and frequency offset estimator 160 runs an exhaustive search using the timing correlator functionality by examining all possible combinations of the data in RAM 135 to find a lowest cost function in order to determine the symbol boundaries. The exhaustive search runs through all sample intervals to determine a maximum likelihood of the start of the SYNC word (the SYNC word typically follows after the preamble, and indicates the start of data). Alternatively, the exhaustive search may be replaced by another search technique, process, algorithm, etc., for example, applying a fixed or dynamic threshold for comparison with the cost function.

In some embodiments, RAM 135 is organized as a circular buffer, and constantly receives and stores samples from phase differentiator 130. In other embodiments, RAM 135 receives phase samples derived from the phase output of the Cordic 125 and Phase differentiation may be processed the output of RAM 135. Other implementations might be used, depending on factors such as design and performance specifications, general receiver architecture, system specifications, and the like, as persons of ordinary skill in the art will understand. Timing correlator and frequency offset estimator 160 is a block that provides several different functionalities. First, timing correlator and frequency offset estimator 160 detects timing boundaries of symbols. When symbol boundaries are known, controller 170 selects data symbols in RAM 135 and feeds those data symbols, after compensated for frequency errors to Viterbi decoder 165. Timing correlator and frequency offset estimator 160 also tracks frequency and timing error and, if appropriate or desired, changes the frequency offset estimate to correct the frequency offset.

Viterbi decoder 165 decodes the bitstream in the signal received from adder 155 to demodulate the received signal. At its input, Viterbi decoder 165 receives "soft code," i.e., symbols provided to Viterbi decoder 165 are not necessarily binary 0 or binary 1 (e.g., if 0 is represented by 10 and 1 is represented by −10, the signals provided to Viterbi decoder 165 might be 9, 11, −12, etc.). Viterbi decoder 165 uses information on multiple bits to make decisions regarding one bit of data, i.e., to determine whether a given bit is binary 0 or binary 1. Put another way, Viterbi decoder 165 is fed with different "soft" symbols and makes decisions based on symbols that arrive first and later (the value of the first symbol is decoded based on the first "soft" symbol and several "soft" symbols arriving later). Viterbi decoder 165 is populated or fed with soft symbols derived from phase differentiator 130. When one symbol is decoded, an additional "soft" symbol is shifted in, and a second symbol is decoded or detected based on a number of subsequent "soft" symbols, for example, four "soft" symbols.

Viterbi decoder 165 provides at its output demodulated data or signals. The output signal of Viterbi decoder 165 is fed back to timing correlator and frequency offset estimator 160 as a "decision feedback" signal. That signal allows timing correlator and frequency offset estimator 160 to adapt to the content of a frame of data. More specifically, the "decision feedback" signal is used to run timing correlator and frequency offset estimator 160 to perform a timing tracking operation or a frequency offset estimate operation. The operations compensate for timing and frequency drift, as typically happens over time. In exemplary embodiments, Viterbi decoder 165 may be replaced with any other decoder that performs MLSE. An example of another MLSE algorithm is published by Schalkwijk, Vinck and Post, "Syndrome decoding of binary rate k/n convolutional codes," IEEE Transactions on Information Theory (1978).

In some embodiments, Viterbi decoder 165 may apply other schemes, for example, where a symbol has four different values. Generally, Viterbi decoder 165 may be implemented in various embodiments to accommodate m-ary modulation, as desired. As noted, the timing correlator and frequency offset estimator 160 is disabled until a signal arrival is detected. Given that the power consumption of DSA 48 is lower than the correlator, less power is dissipated. Given that relatively large amounts of power are typically consumed in preamble search mode in a receiver, use of DSA 48 in the manner described provides reduction of the overall power consumption of the receiver.

Thus, to summarize, the circuit arrangement in FIG. 9, for example, Cordic 125 and phase differentiator 130, may be used to build a receiver with multi-bit observation interval. The timing correlator is started using a signal detect indication from DSA 48 and an initial frequency offset estimate from controller 170 or initial frequency offset estimator 145. Timing correlator and frequency offset estimator 160 serves as a multi-purpose correlator engine. More specifically, timing correlator and frequency offset estimator 160 performs the following functions: (a) initial timing detection (finding the symbol boundaries) or estimation (exhaustive search); (b) second frequency offset estimation (the first estimation is performed by initial frequency offset estimator 145); (c) timing tracking (to compensate for changes, over time, in symbol boundaries); and (d) frequency offset tracking (to compensate for changes over time in the frequency offset). Using one block or subsystem reduces the number of circuit elements, such as gates, to provide the above functionality, which in turn results in reduced semiconductor die area and, hence, cost.

Figure 10:
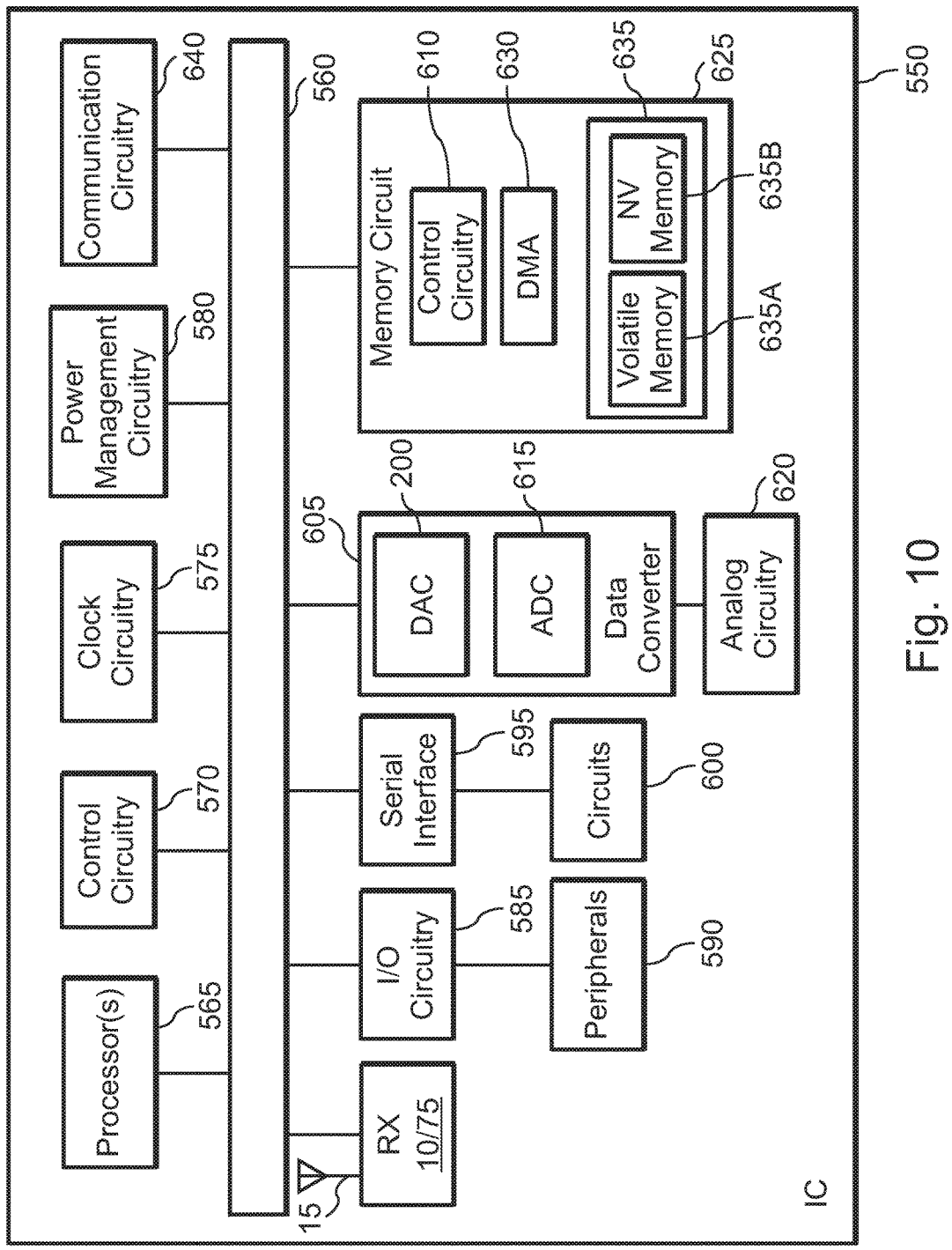
FIG. 10 illustrates a block diagram of an IC according to an exemplary embodiment.

Receivers according to exemplary embodiments may be combined with other circuitry, for example, by integrating the receiver and signal processing, logic, or computing circuitry within an IC. FIG. 10 illustrates an IC 550, for example, a microcontroller unit (MCU), that combines a receiver with other circuit blocks according to an exemplary embodiment. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductors for communicating information, such as data, commands, status information, and the like.

IC 550 may include link 560 coupled to one or more processors 565, clock circuitry 575, and power management circuitry 580. In some embodiments, processor(s) 565 may include circuitry or blocks for providing computing functions, such as central-processing units (CPUs), arithmetic-logic units (ALUs), and the like. In some embodiments, in addition, or as an alternative, processor(s) 565 may include one or more digital signal processors (DSPs). The DSPs may provide a variety of signal processing functions, such as arithmetic functions, filtering, delay blocks, and the like, as desired. In some embodiments, functionality of parts of receiver 10/75, such as those described above, may be implemented or realized using some of the circuitry in processor(s) 565, as desired.

Referring again to FIG. 10, clock circuitry 575 may generate one or more clock signals that facilitate or control the timing of operations of one or more blocks in IC 550. Clock circuitry 575 may also control the timing of operations that use link 560. In some embodiments, clock circuitry 575 may provide one or more clock signals via link 560 to other blocks in IC 550.

In some embodiments, power management circuitry 580 may reduce an apparatus's (e.g., IC 550) clock speed, turn off the clock, reduce power, turn off power, or any combination of the foregoing with respect to part of a circuit or all components of a circuit. Further, power management circuitry 580 may turn on a clock, increase a clock rate, turn on power, increase power, or any combination of the foregoing in response to a transition from an inactive state to an active state (such as when processor(s) 565 make a transition from a low-power or idle or sleep state to a normal operating state).

Link 560 may couple to one or more circuits 600 through serial interface 595. Through serial interface 595, one or more circuits coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with other blocks coupled to link 560, e.g., processor(s) 365, memory circuit 625, etc.

In exemplary embodiments, peripherals 590 may include a variety of circuitry, blocks, and the like. Examples include I/O devices (keypads, keyboards, speakers, display devices, storage devices, timers, etc.). Note that in some embodiments, some peripherals 590 may be external to IC 550. Examples include keypads, speakers, and the like. In some embodiments, with respect to some peripherals, I/O circuitry 585 may be bypassed. In such embodiments, some peripherals 590 may couple to and communicate with link 560 without using I/O circuitry 585. Note that in some embodiments, such peripherals may be external to IC 550, as described above.

Link 560 may couple to analog circuitry 620 via data converter 605. Data converter 405 may include one or more ADCs 615 and/or one or more DACs 200. The ADC(s) 615 receive analog signal(s) from analog circuitry 620, and convert the analog signal(s) to a digital format, which they communicate to one or more blocks coupled to link 560. Conversely, DAC(s) 200 receive one or more digital signals from one or more blocks coupled to link 560, and convert the digital signal(s) to an analog format. The analog signal(s) may be provided to circuitry within (e.g., analog circuitry 620) or circuitry external to IC 550, as desired. Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks, and information processing blocks, as desired.

Control circuitry 570 couples to link 560. Thus, control circuitry 570 may communicate with and/or control the operation of various blocks coupled to link 560. In addition or as an alternative, control circuitry 570 may facilitate communication or cooperation between various blocks coupled to link 560. In some embodiments, the functionality or circuitry of control circuits in receiver 10/75 (e.g., controller 170 or 250 described above) may be combined with or included with the functionality or circuitry of control circuitry 570, as desired.

Referring again to FIG. 10, in some embodiments, control circuitry 570 may initiate or respond to a reset operation. The reset operation may cause a reset of one or more blocks coupled to link 560, of IC 550, etc., as person of ordinary skill in the art will understand. For example, control circuitry 570 may cause receiver 10/75 to reset to an initial state. In exemplary embodiments, control circuitry 570 may include a variety of types and blocks of circuitry. In some embodiments, control circuitry 570 may include logic circuitry, FSMs, or other circuitry to perform a variety of operations, such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples include universal serial bus (USB), Ethernet, and the like. In exemplary embodiments, other communication protocols may be used, depending on factors such as specifications for a given application, as person of ordinary skill in the art will understand.

As noted, memory circuit 625 couples to link 560. Consequently, memory circuit 625 may communicate with one or more blocks coupled to link 560, such as processor(s) 365, control circuitry 570, I/O circuitry 585, etc. In the embodiment shown, memory circuit 625 includes control circuitry 610, memory array 635, and direct memory access (DMA) 630. Control circuitry 610 controls or supervises various operations of memory circuit 625. For example, control circuitry 610 may provide a mechanism to perform memory read or write operations via link 360. In exemplary embodiments, control circuitry 610 may support various protocols, such as double data rate (DDR), DDR2, DDR3, and the like, as desired. In some embodiments, the memory read and/or write operations involve the use of one or more blocks in IC 550, such as processor(s) 565. DMA 630 allows increased performance of memory operations in some situations. More specifically, DMA 630 provides a mechanism for performing memory read and write operations directly between the source or destination of the data and memory circuit 625, rather than through blocks such as processor(s) 565.

Memory array 635 may include a variety of memory circuits or blocks. In the embodiment shown, memory array 635 includes volatile memory 635A and non-volatile (NV) memory 635B. In some embodiments, memory array 635 may include volatile memory 635A. In some embodiments, memory array 635 may include NV memory 635B. NV memory 635B may be used for storing information related to performance or configuration of one or more blocks in IC 550. For example, NV memory 635B may store configuration information related to various operations of receiver 10/75 and/or to initial or ongoing configuration or control of receiver 10/75, as desired.

As described above in detail, receiver 10/75 receives RF signals via antenna 15, and processes those signals. The resulting data signals are provided to one or more blocks of circuitry in IC 550 via link 560. Furthermore, various blocks of circuitry in IC 550 may be used to process the received data and to generate additional data or signals, which may be used to control other circuitry, etc. In some embodiments, a transmitter (not shown) may be included in IC 550. In such configurations, the transmitter may transmit information generated or processed in IC 550, such as information derived from, based on, or related to data received by receiver 10/75. Thus, sophisticated control and communication subsystems, blocks, circuits, or systems for processing information and/or control may be implemented.

Various circuits and blocks described above and used in exemplary embodiments may be implemented in a variety of ways and using a variety of circuit elements or blocks. For example, absolute RSSI detector 703, relative RSSI detector 706, frequency offset detector 709, SC 712, SWD 718, demodulator 715, controller 250, delay circuits 733, adder 736, adder 739, adder 742, and comparator 745, as well as the circuitry shown in the example receiver of FIG. 9, may generally be implemented using digital circuitry. The digital circuitry may include circuit elements or blocks such as gates, digital MUXs, latches, flip-flops, registers, FSMs, processors, programmable logic (e.g., field programmable gate arrays (FPGAs) or other types of programmable logic), arithmetic-logic units (ALUs), standard cells, custom cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

As persons of ordinary skill in the art will understand, one may apply the disclosed concepts effectively to various electronic devices, apparatus, circuitry, systems, blocks, and/or subsystems. Examples described in this document (e.g., MCU) constitute merely illustrative applications, and are not intended to limit the application of the disclosed concepts to other types of electronic devices, such as other types of IC, by making appropriate modifications, as persons of ordinary skill in the art will understand.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus comprising:
a radio frequency (RF) receiver comprising:
a digital signal arrival (DSA) detector to detect arrival of a transmitted signal, the DSA detector comprising a signal correlator coupled to a relative received signal strength indication (RSSI) detector;
a demodulator coupled to the DSA detector to demodulate a received signal and to provide a demodulated signal;
a synchronization word detector (SWD) coupled to the demodulator to receive the demodulated signal; and
a controller, wherein the relative RSSI detector provides a first detect signal to the controller when a current RSSI value exceeds a sum of a threshold and an earlier RSSI value.

2. The apparatus according to claim 1, wherein the DSA detector comprises an absolute RSSI detector, and wherein the absolute RSSI detector provides a detect signal to the controller when an RSSI value exceeds a threshold.

3. The apparatus according to claim 1, wherein the controller uses the detect signal to qualify, start, or enable operation of the signal correlator.

4. The apparatus according to claim 1, wherein the controller uses the first detect signal to qualify or enable operation of the signal correlator.

5. The apparatus according to claim 1, wherein the relative RSSI detector provides a second detect signal to the controller, wherein the second detect signal is derived from an updated earlier RSSI value.

6. The apparatus according to claim 1, wherein the relative RSSI detector comprises a finite impulse response (FIR) filter coupled to first and second adders, wherein the FIR filter receives an RSSI value, and the first and second adders provide the current and earlier RSSI values, respectively.

7. The apparatus according to claim 1, wherein the DSA detector further comprises an absolute RSSI detector, and/or (c) a frequency offset detector.

8. The apparatus according to claim 6, wherein the relative RSSI detector further comprises:

a third adder to add the earlier RSSI value and the threshold to provide a sum; and a comparator to provide the first detect signal to the controller when a current RSSI value exceeds the sum.

9. An integrated circuit (IC), comprising:
a radio frequency (RF) receiver, comprising:
   a controller;
   a signal correlator coupled to the controller, the signal correlator to detect arrival of a signal and to provide a first detect signal to the controller;
   a received signal strength indication (RSSI) detector coupled to the controller to provide at least one detect signal to the controller in response to a digital in-phase (I) signal and a digital quadrature (Q) signal derived from a received radio frequency (RF) signal, wherein the RSSI detector further comprises a relative RSSI detector to provide a second detect signal to the controller when a current RSSI value exceeds a sum of a threshold and an earlier RSSI value; and
   a frequency offset detector coupled to the controller to provide a frequency error signal to the controller.

10. The IC according to claim 9, wherein the RSSI detector comprises an absolute RSSI detector to provide a third detect signal to the controller when an RSSI value exceeds a first threshold.

11. The IC according to claim 9, wherein the controller uses the first detect signal to qualify or enable operation of the signal correlator.

12. The IC according to claim 9, wherein the relative RSSI detector comprises:
   a finite impulse response (FIR) filter coupled to first and second adders, wherein the FIR filter receives an RSSI value, and the first and second adders provide the current and earlier RSSI values, respectively;
   a third adder to add the earlier RSSI value and the threshold to provide a sum; and
   a comparator to provide the first detect signal to the controller when a current RSSI value exceeds the sum.

13. The IC according to claim 10, wherein the relative RSSI detector provides a fourth detect signal to the controller, wherein the fourth detect signal is derived from an updated earlier RSSI value.

14. The IC according to claim 13, wherein the controller uses at least one of the first, second, third, and fourth detect signals to receive transmitted information.

15. A method of receiving radio frequency (RF) signals, the method comprising:
   detecting, by using a digital signal arrival detector, arrival of a transmitted signal, by using a signal correlator, and a relative RSSI detector to provide a first detect signal when a current RSSI value exceeds a sum of a threshold and an earlier RSSI value;
   demodulating the transmitted signal to provide a demodulated signal; and
   detecting a synchronization word in the demodulated signal.

16. The method according to claim 15, wherein the digital signal arrival detector includes an absolute RSSI detector, the method further comprising using the absolute RSSI detector to provide a second detect signal when an RSSI value exceeds a threshold.

17. The method according to claim 15, further comprising qualifying or enabling operation of the signal correlator by using the first detect signal.

18. The method according to claim 15, further comprising using the relative RSSI detector to provide a third detect signal, wherein the third detect signal is derived from an updated earlier RSSI value.

19. The method according to claim 15, wherein detecting, by using the digital signal arrival detector, arrival of the transmitted signal, further comprises using an absolute RSSI detector and/or a frequency offset detector.

20. The method according to claim 16, further comprising qualifying, starting, or enabling operation of the signal correlator by using the second detect signal.

* * * * *